United States Patent
Park et al.

(10) Patent No.: US 9,207,369 B2
(45) Date of Patent: Dec. 8, 2015

(54) OPTICAL MODULATOR AND METHOD OF MANUFACTURING THE OPTICAL MODULATOR

(71) Applicant: SAMSUNG ELECTRONICS CO., LTD., Suwon-si (KR)

(72) Inventors: Yeon-sang Park, Seoul (KR); Jin-eun Kim, Suwon-si (KR); Chang-won Lee, Hwaseong-si (KR); Un-jeong Kim, Hwaseong-si (KR); Young-geun Roh, Seoul (KR); Jae-soong Lee, Suwon-si (KR); Sang-mo Cheon, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/172,372

(22) Filed: Feb. 4, 2014

(65) Prior Publication Data

US 2014/0233877 A1    Aug. 21, 2014

(30) Foreign Application Priority Data

Feb. 15, 2013  (KR) .................. 10-2013-0016592

(51) Int. Cl.
    *G02B 6/12*     (2006.01)
    *G02B 5/00*     (2006.01)
    *G02B 6/122*    (2006.01)

(52) U.S. Cl.
    CPC ............. *G02B 5/008* (2013.01); *G02B 6/1226* (2013.01); *Y10T 29/49826* (2015.01)

(58) Field of Classification Search
    None
    See application file for complete search history.

(56) References Cited

U.S. PATENT DOCUMENTS

| 6,587,252 | B1 |   | 7/2003  | Bottrell et al. |
| 7,039,315 | B2 | * | 5/2006  | Blumberg et al. ............ 398/49 |
| 7,576,899 | B2 |   | 8/2009  | Kanesaka et al. |
| 7,583,882 | B2 | * | 9/2009  | Guo ........................... 385/131 |
| 8,031,990 | B2 |   | 10/2011 | Hyde et al. |
| 8,094,317 | B1 | * | 1/2012  | Ptasinski et al. ............ 356/445 |
| 2004/0069984 | A1 | * | 4/2004 | Estes et al. ..................... 257/25 |
| 2005/0265652 | A1 |   | 12/2005 | Blumberg et al. |
| 2006/0221419 | A1 |   | 10/2006 | Yoshikawa et al. |
| 2009/0051990 | A1 |   | 2/2009  | Przygodda et al. |
| 2009/0195782 | A1 |   | 8/2009  | Blumberg et al. |
| 2010/0039693 | A1 |   | 2/2010  | Kobyakov et al. |
| 2010/0215372 | A1 | * | 8/2010 | Kitazawa et al. .............. 398/79 |

FOREIGN PATENT DOCUMENTS

DE    102007031841 A1  *  1/2009  ............ H01P 5/12
JP       200948681 A       3/2009

OTHER PUBLICATIONS

Kosaka, Hideo et al, "Photonic crystals for micro lightwave circuits using wavelength-dependent angular beam steering," Applied Physics Letters, vol. 74, No. 10; Mar. 8, 1999; pp. 1-4.

Ohtera, Y. et al, "Photonic crystal polarisation splitters," Electronics Letters, vol. 35, No. 75; Jul. 22, 1999; pp. 1271-1272.

* cited by examiner

*Primary Examiner* — Mike Stahl
(74) *Attorney, Agent, or Firm* — Sughrue Mion, PLLC

(57) ABSTRACT

An optical modulator includes a dielectric layer and a metal layer arranged on the dielectric layer. In the optical modulator, a first light of a first frequency and a second light of a second frequency that are incident upon the metal layer exit from the metal layer at different refractive angles due to surface plasmon generation.

15 Claims, 3 Drawing Sheets

OPTICAL MODULATOR AND METHOD OF MANUFACTURING THE OPTICAL MODULATOR

CROSS-REFERENCE TO RELATED APPLICATIONS

This application claims priority from Korean Patent Application No. 10-2013-0016592, filed on Feb. 15, 2013, in the Korean Intellectual Property Office, the disclosure of which is incorporated herein in its entirety by reference.

BACKGROUND

1. Field

Methods and apparatuses consistent with the exemplary embodiments relate to an optical modulator that adjusts a refractive angle of light by using surface plasmon, and a method of manufacturing the optical modulator.

2. Description of the Related Art

An optical integrated circuit is an optical circuit obtained by integrating, on a single substrate, various optical devices for performing various functions such as light emission, light detection, light amplification, light modulation, etc. For example, a light source, a photodetector, an optical waveguide, a lens, a diffraction grating, an optical switch, etc. may be integrated on a single substrate. An optical integrated circuit may be applied to a variety of fields such as optical recording/reproducing apparatuses, optical communication apparatuses, display apparatuses, optical computers, etc.

An optical device has a fast processing speed due to its use of light. While an electrical device has decreased its size down to tens to hundreds of nanometers, an optical device is difficult to have a size reduced less than a wavelength of used light due to a light diffraction limitation characteristic. Accordingly, it is difficult to manufacture an optical device having a size of several micrometers or less. Thus, there is a limitation in manufacturing an optical integrated circuit by using the optical devices. To address this issue, an optical modulator that may be applied to a high density integrated circuit has been studied.

SUMMARY

Provided is an optical modulator that refracts light at different angles according to a wavelength thereof.

Additional aspects will be set forth in part in the description which follows and, in part, will be apparent from the description, or may be learned by practice of the presented exemplary embodiments.

According to an aspect of the exemplary embodiments, an optical modulator includes a dielectric layer and a metal layer arranged on the dielectric layer, in which a first light of a first frequency and a second light of a second frequency that are incident upon the metal layer exit from the metal layer at different refractive angles due to surface plasmon generation.

The first light and the second light may be incident upon the metal layer at the same incident angle.

The first light may exit from the metal layer at a negative refractive angle and the second light may exit from the metal layer at a positive refractive angle.

The first frequency may be higher than the second frequency.

A difference in the refractive angle may increase as a difference in a frequency between the first light and the second light increases.

The surface plasmon generation may occur between the metal layer and the dielectric layer.

The metal layer may be arranged in a partial area of the dielectric layer.

An exit end of the metal layer through which the first and second lights exit may be perpendicular to a lengthwise direction of the metal layer.

An exit end of the metal layer, through which the first and second lights exit, may be inclined with respect to a lengthwise direction of the metal layer.

The metal layer may have a hexahedral shape having a length, a width, and a thickness.

The refractive angle may be adjusted according to at least one of the width and thickness.

The thickness of the metal layer may be equal to or greater than 50 nm.

The width of the metal layer may be equal to or less than 1 µm.

The optical modulator may include an optical router.

According to another aspect of the exemplary embodiments, a method of manufacturing an optical modulator includes preparing a dielectric layer and forming a metal layer in an area of the dielectric layer, in which a refractive angle of light exiting from the metal layer is adjusted by at least one of a thickness and a width of the metal layer.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF THE EXEMPLARY EMBODIMENTS

Figure 1:
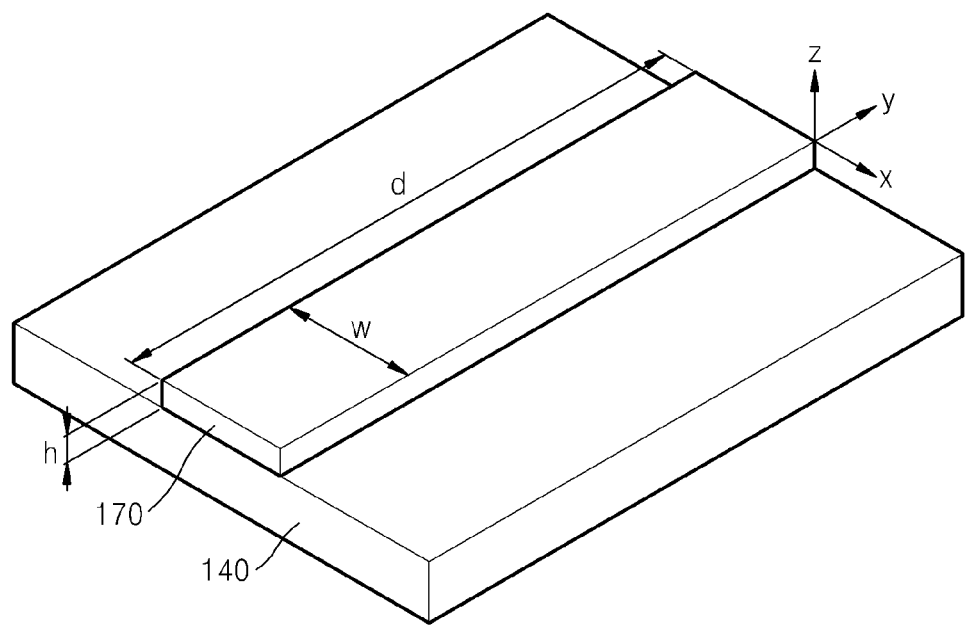
FIG. 1 is a perspective view illustrating an optical modulator according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

As used herein, the term "and/or" includes any and all combinations of one or more of the associated listed items. Expressions such as "at least one of," when preceding a list of elements, modify the entire list of elements and do not modify the individual elements of the list.

FIG. 1 is a perspective view illustrating an optical modulator according to an exemplary embodiment. Referring to FIG. 1, the optical modulator according to the present exemplary embodiment may include a dielectric layer 140 and a metal layer 170 arranged on the dielectric layer 140.

The dielectric layer 140 may be formed of a dielectric material. A dielectric material may include a material such as liquid crystal having a refractive angle that changes according to an electrical signal or a permittivity that changes according to a thermal signal. For example, a dielectric material may include at least one of $ZrO_2$, $TiO_2$, MgO, $CeO_2$, $Al_2O_3$, $HfO_2$, NbO, $SiO_2$, and glass.

The metal layer 170 is arranged on the dielectric layer 140 and may be formed of metal that can easily generate surface plasmons. For example, the metal layer 170 may be formed of a metal material such as gold (Au), silver (Ag), or aluminum (Al). In addition, metal such as copper (Cu), lead (Pb), indium (In), tin (Sn), or cadmium (Cd) may be used. The thickness of the metal layer 170 may be equal to or greater than 50 nm. The width of the metal layer 170 may be equal to or less than a wavelength of light, for example, 1 μm.

The metal layer 170 may be arranged in only a partial area of the dielectric layer 140 and may guide incident light. The metal layer 170 may be a hexahedron having a width "W", a thickness "h", and a length "d".

When light is incident on the metal layer 170, if a relationship between the dielectric layer 140 and the metal layer 170 satisfy a surface plasmon generation condition, surface plasmons are generated at a boundary surface between the dielectric layer 140 and the metal layer 170. The surface plasmon refers to, as a mode of an electromagnetic field that progresses along the boundary surface between the dielectric layer 140 and the metal layer 170, a charge density vibration that is generated as energy of incident light excites free electrons in the metal layer 170. As a transverse magnetic polarized wave that progresses along the boundary surface, surface plasmons have a maximum value at the boundary surface between the dielectric layer 140 and the metal layer 170, and exponentially decrease in a direction perpendicular to the surface of the metal layer 170. As such, when surface plasmon generation occurs in the optical modulator, light is refracted not with refractive indices specific to the dielectric layer 140 and the metal layer 170, but by an effective refractive index obtained from a combination of the refractive index of the metal layer 170 and the refractive index of the dielectric layer 140.

For example, when surface plasmon generation occurs in an optical modulator formed with a single metal layer 170 and a single dielectric layer 140, the number of waves $k_{sp}$ may be expressed as in Equation 1.

$$k_{sp} = \frac{\omega}{c} \sqrt{\frac{\varepsilon_m \varepsilon_d}{\varepsilon_m + \varepsilon_d}} \qquad \text{[Equation 1]}$$

In Equation 1, "ω" is an angular frequency of incident light, "c" is a speed of light, "$\varepsilon_m$" is a permittivity of the metal layer 170, and "$\varepsilon_d$" is a permittivity of the dielectric layer 140. Since the permittivity varies according to a frequency of light, the number of waves is not simply proportional to the frequency.

Figure 2A:
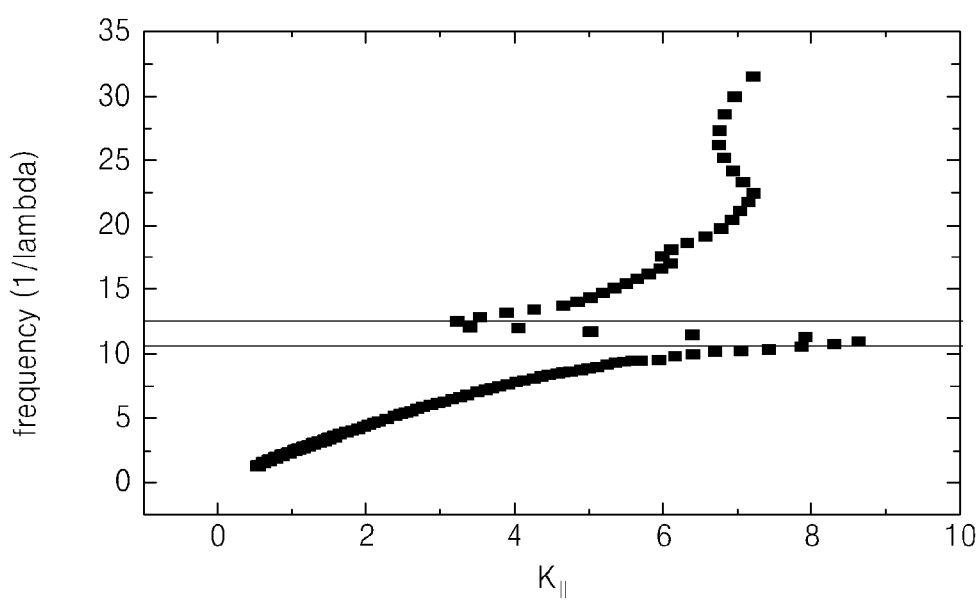
FIG. 2A is a graph showing a dispersion relationship between wave number and frequency of light in an optical modulator formed of a single dielectric layer and a single metal layer, according to an exemplary embodiment.
Figure 2B:
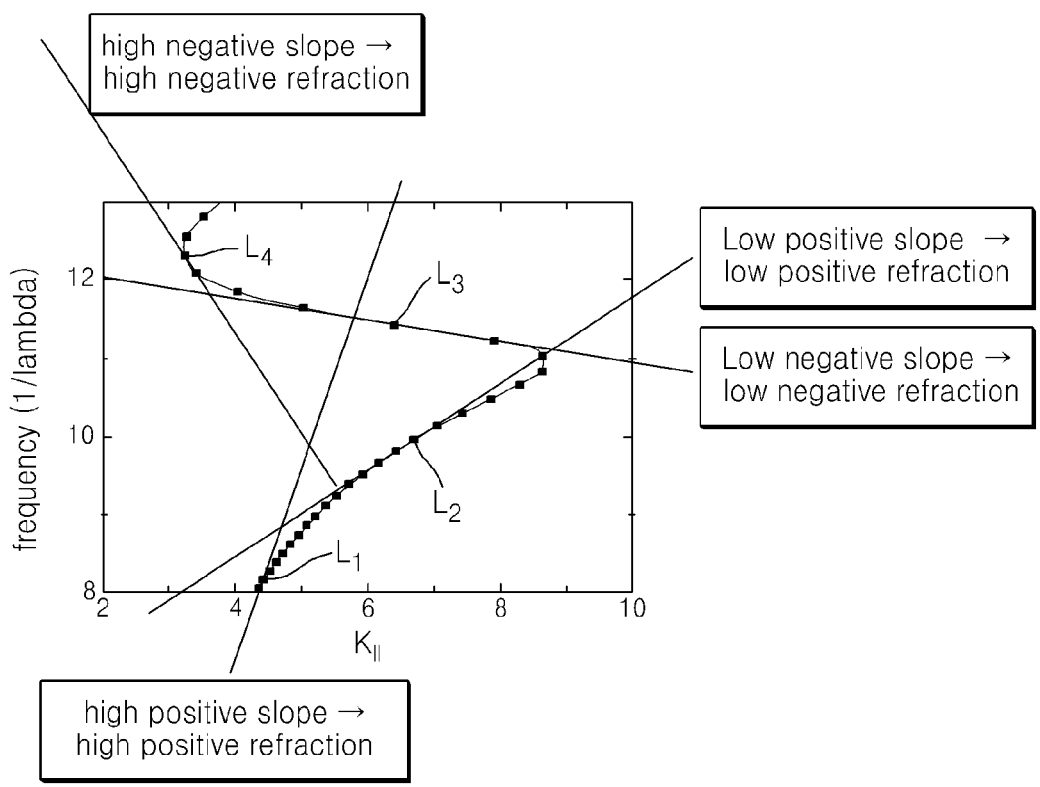
FIG. 2B is an enlarged graph showing a relationship between the wave number and the frequency in a particular frequency band in the dispersion relationship of FIG. 2A.

FIG. 2A is a graph showing a dispersion relationship between the wave number ($K_{II}$) and frequency of light in an optical modulator formed of a single dielectric layer and a single metal layer, according to an exemplary embodiment. FIG. 2B is an enlarged graph showing a relationship between the wave number ($K_{II}$) and the frequency in a particular frequency band in the dispersion relationship of FIG. 2A.

Referring to FIG. 2A, when light of a low frequency band is incident, the light has a dispersion relationship similar to that of a photon, that is, the frequency of light and the number of waves of the light are proportional to each other. On the other hand, when light of a high frequency band is incident, surface plasmon generation occurs between a dielectric layer and a metal layer, and a dispersion relationship has at least one point of inflection. In other words, for light of a particular frequency, the frequency and the number of waves of the light may be inversely proportional to each other.

In the dispersion relationship, a reciprocal of inclination at a particular point signifies an effective index "

$$n_{\textit{eff}} = \frac{c}{\frac{\partial \omega}{\partial k}}$$

" of an optical modulator with respect to a wave having a frequency corresponding to the particular point. For example, referring to FIG. 2B, since a first light L1 having a first frequency has a relatively high positive slope in the dispersion relationship, the optical modulator with respect to the first light L1 has a relatively high positive refraction. Since a second light L2 having a second frequency has a relatively low positive slope in the dispersion relationship, the optical modulator with respect to the second light L2 has a relatively low positive refraction. Since a third light L3 having a third frequency has a relatively low negative slope in the dispersion relationship, the optical modulator with respect to the third light L3 has a relatively low negative refraction. Since a fourth light L4 having a fourth frequency has a relatively high negative slope in the dispersion relationship, the optical modulator with respect to the fourth light L4 has a relatively high negative refraction When a plurality of lights are emitted from the optical modulator, the lights are refracted outwardly according to Snell's Law. In other words, the first light L1 is refracted at a high positive refractive angle, the second light L2 is refracted at a low positive refractive angle, the third light L3 is refracted at a low negative refractive angle, and the fourth light L4 is refracted at a high negative refractive angle. Thus, the lights having different energies, even when emitted from the optical modulator at the same incident angle, may be refracted outwardly at different refractive angles.

Figure 3:
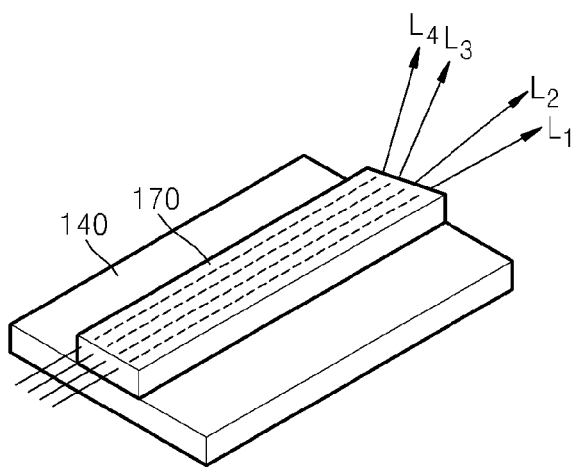
FIG. 3 is a perspective view schematically illustrating a refractive angle when first to fourth light beams are emitted from the optical modulator.

FIG. 3 is a perspective view schematically illustrating a refractive angle when the first to fourth light beams are emitted from the optical modulator. Referring to FIG. 3, even when the first to fourth lights L1, L2, L3, and L4 are incident upon the optical modulator at the same incident angle, the lights L1, L2, L3, and L4 are refracted at different refractive angles when exiting from the optical modulator. Accordingly, even when the first to fourth lights L1, L2, L3, and L4 propagate through an optical modulator that is a single waveguide, the lights L1, L2, L3, and L4 are refracted at different refractive angles so as to be easily split into the first to fourth lights L1, L2, L3, and L4. The optical modulator may be used as an optical router that classifies a plurality of lights by refracting the lights at different angles. Furthermore, the optical modulator may be used for optical modulation of an optical integrated circuit.

In particular, since the optical modulator has a negative refraction with respect to light in a particular frequency band, the light exiting from the optical modulator may be refracted at a negative refractive angle. Thus, the optical modulator according to the exemplary embodiment may classify a plurality of lights within a maximum range of about 180°. As a result, light may be classified in a relatively wide angular range by using surface plasmons.

Figure 4:
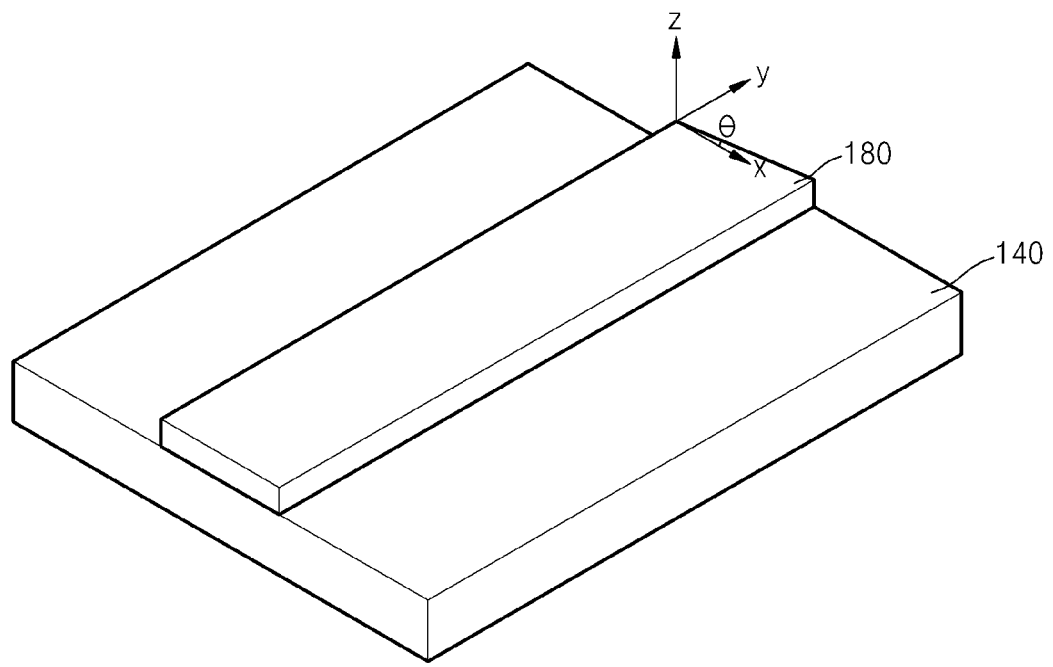
FIG. 4 is a perspective view illustrating an optical modulator according to another exemplary embodiment.

FIG. 4 is a perspective view illustrating an optical modulator according to another exemplary embodiment. When the optical modulator of FIG. 4 and the optical modulator of FIG. 1 are compared with each other, the constituent elements are the same except for the shape of a metal layer 180. In the metal layer 170 of FIG. 1, an incident end through which light is incident upon the metal layer 170, and an exit end through which light exits from the metal layer 170 are both perpendicular to a lengthwise direction of the metal layer 170. Thus, the light is incident upon the metal layer 180 through the incident end and then proceeds in the lengthwise direction and exits outside the metal layer 180 through the exit end. An incident end of the metal layer 180 of FIG. 4 is perpendicular to the lengthwise direction of the metal layer 180, whereas an exit end is slightly inclined with respect to the lengthwise direction. Thus, a refractive angle of light emitted from the optical modulator may be adjusted by changing the inclination of the exit end with respect to the lengthwise direction of the metal layer 180.

Also, since the number of waves of light passing through the optical modulator is related to permittivity of the dielectric layer 140 and the metal layer 180, a refractive angle of light emitted from the optical modulator may be adjusted by adjusting at least one of the permittivity of the dielectric layer 140 and the metal layer 180.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

What is claimed is:

1. An optical modulator comprising:
    a dielectric layer; and
    a metal layer arranged on the dielectric layer,
    wherein a first light of a first frequency and a second light of a second frequency, which are each incident upon the metal layer, exit from the metal layer at different refractive angles due to surface plasmon generation,
    wherein the metal layer is a hexahedron having a width smaller than a width of the dielectric layer, and
    an incident end of the metal layer is perpendicular to the lengthwise direction of the metal layer, whereas an exit end of the metal layer is inclined with respect to the lengthwise direction.

2. The optical modulator of claim 1, wherein the first light and the second light are incident upon the metal layer at a same incident angle.

3. The optical modulator of claim 1, wherein the first light exits from the metal layer at a negative refractive angle and the second light exits from the metal layer at a positive refractive angle.

4. The optical modulator of claim 3, wherein the first frequency is higher than the second frequency.

5. The optical modulator of claim 1, wherein a difference in the refractive angles increases as a difference in a frequency between the first light and the second light increases.

6. The optical modulator of claim 1, wherein the surface plasmon generation occurs between the metal layer and the dielectric layer.

7. The optical modulator of claim 1, wherein the metal layer is arranged on a partial area of the dielectric layer.

8. The optical modulator of claim 1, wherein the refractive angle depends on at least one from among the width and thickness of the metal layer.

9. The optical modulator of claim 1, wherein the thickness of the metal layer is equal to or greater than 50 nm.

10. The optical modulator of claim 1, wherein the width of the metal layer is equal to or less than 1 μm.

11. An optical router comprising the optical modulator of claim 1.

12. A method of manufacturing an optical modulator, the method comprising:
    forming a dielectric layer; and
    forming a metal layer in an area on a surface of the dielectric layer,
    wherein a refractive angle of light exiting from the metal layer depends on at least one from among a thickness and a width of the metal layer,
    wherein the metal layer is a hexahedron shape having a width smaller than a width of the dielectric layer, and
    an incident end of the metal layer is perpendicular to the lengthwise direction of the metal layer 180, whereas an exit end of the metal layer is inclined with respect to the lengthwise direction.

13. An optical modulator comprising:
    a dielectric layer; and
    a metal layer arranged on the dielectric layer and which guides incident light;
    wherein the metal layer is a hexahedron shape having a width smaller than a width of the dielectric layer, and
    an incident end of the metal layer is perpendicular to the lengthwise direction of the metal layer 180, whereas an exit end of the metal layer is inclined with respect to the lengthwise direction.

14. The optical modulator of claim 13, wherein surface plasmons are generated at a boundary surface between the dielectric layer and the metal layer.

15. The optical modulator of claim 14, wherein an energy of the surface plasmons has a maximum value at the boundary surface between the dielectric layer and the metal layer, and exponentially decreases in a direction perpendicular to the surface of the metal layer.

* * * * *